(12) United States Patent
Chung (10) Patent No.: US 11,326,688 B1
(45) Date of Patent: May 10, 2022

(54) PLANETARY GEAR SET

(71) Applicant: ArvinMeritor Technology, LLC, Troy, MI (US)

(72) Inventor: I-Chao Chung, Troy, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 0 days.

(21) Appl. No.: 17/231,426

(22) Filed: Apr. 15, 2021

(51) Int. Cl.
*F16H 57/08* (2006.01)
*B60K 17/04* (2006.01)
*F16H 1/28* (2006.01)

(52) U.S. Cl.
CPC .......... *F16H 57/08* (2013.01); *B60K 17/046* (2013.01); *F16H 1/28* (2013.01); *F16H 57/082* (2013.01); *F16H 2057/085* (2013.01)

(58) Field of Classification Search
CPC ............................ F16H 57/082; B60K 17/046
See application file for complete search history.

(56) References Cited

U.S. PATENT DOCUMENTS

| | | | | |
|---|---|---|---|---|
| 5,332,318 | A * | 7/1994 | Chiba | F16C 19/48 384/569 |
| 9,868,322 | B1 | 1/2018 | Varela | |
| 2019/0003573 | A1* | 1/2019 | Becka | F16H 1/46 |
| 2020/0378490 | A1* | 12/2020 | Briceno | F16H 57/021 |

OTHER PUBLICATIONS

U.S. Appl. No. 16/991,869, filed Aug. 12, 2020; 25 Pages.
U.S. Appl. No. 17/154,031, filed Jan. 21, 2021; 29 Pages.
Disclosure Statement submitted herewith.

* cited by examiner

*Primary Examiner* — Derek D Knight
(74) *Attorney, Agent, or Firm* — Brooks Kushman PC (57) ABSTRACT

A planetary gear set having a planet shaft that extends from a planet gear carrier into a hole in a planet gear. At least one set of bearing rollers may be received inside the hole and may rotatably support the planet gear on the planet shaft. A first shaft thrust washer may extend between the planet gear carrier and a set of bearing rollers.

20 Claims, 4 Drawing Sheets

PLANETARY GEAR SET

TECHNICAL FIELD

This disclosure relates to a planetary gear set and configurations for supporting planet gears of a planetary gear set.

BACKGROUND

An axle assembly having a planetary gear set is disclosed in U.S. Pat. No. 9,868,322.

SUMMARY

In at least one embodiment a planetary gear set is provided. The planetary gear set may include a planet gear carrier, a planet gear, a planet shaft, a first set of bearing rollers, and a first shaft thrust washer. The planet gear may define a hole and may be rotatable about a planet gear axis. The planet shaft may extend from the planet gear carrier into the hole. At least one set of bearing rollers may be received inside the hole and may rotatably support the planet gear on the planet shaft. The first shaft thrust washer may extend between the planet gear carrier and the first set of bearing rollers.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

As an overview, the present invention relates to a planetary gear set and more specifically to arrangements for rotatably supporting one or more planet gears of the planetary gear set. The planetary gear set will be described below primarily in the context of a wheel end assembly; however, it is contemplated that the planetary gear set and arrangements for rotatably supporting a planet gear are not limited to wheel end assemblies and may also be applied to any planetary gear set in which planet gears are rotatably supported on a planet shaft that is cantilevered from a planet gear carrier.

Figure 1:
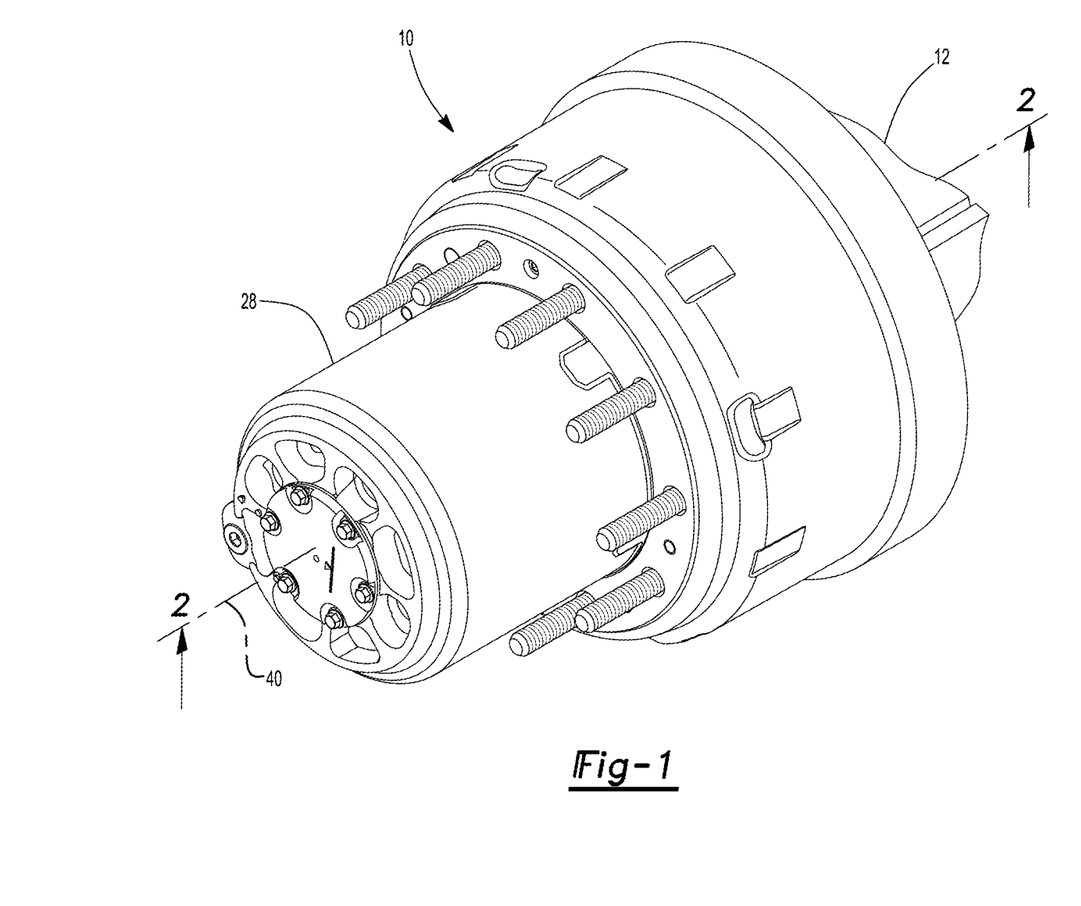
FIG. 1 is a perspective view of an example of a wheel end assembly.

Referring to FIG. 1, an example of a wheel end assembly 10 is shown. The wheel end assembly 10 may be provided with a vehicle like a truck, bus, farm equipment, mining equipment, military transport or weaponry vehicle, or cargo loading equipment for land, air, or marine vessels. The vehicle may include a trailer for transporting cargo in one or more embodiments.

The wheel end assembly 10 may be configured to support a vehicle wheel and a brake assembly. The wheel end assembly 10 may be disposed on or may be mounted to a structural component 12 and may be provided in a steerable configuration or a non-steerable configuration. In a steerable configuration, the wheel end assembly 10 may be mounted to a steerable structural component, such as a steering knuckle. In a non-steerable configuration, the wheel end assembly 10 may be mounted to a non-steerable structural component, such as a non-rotatable knuckle or an axle housing of an axle assembly. In at least one configuration and as is best shown with reference to FIG. 2, the wheel end assembly 10 may include a spindle 20, a hub 22, at least one wheel bearing 24, an axle shaft 26, a hub housing 28, and a planetary gear set 30.

Figure 2:
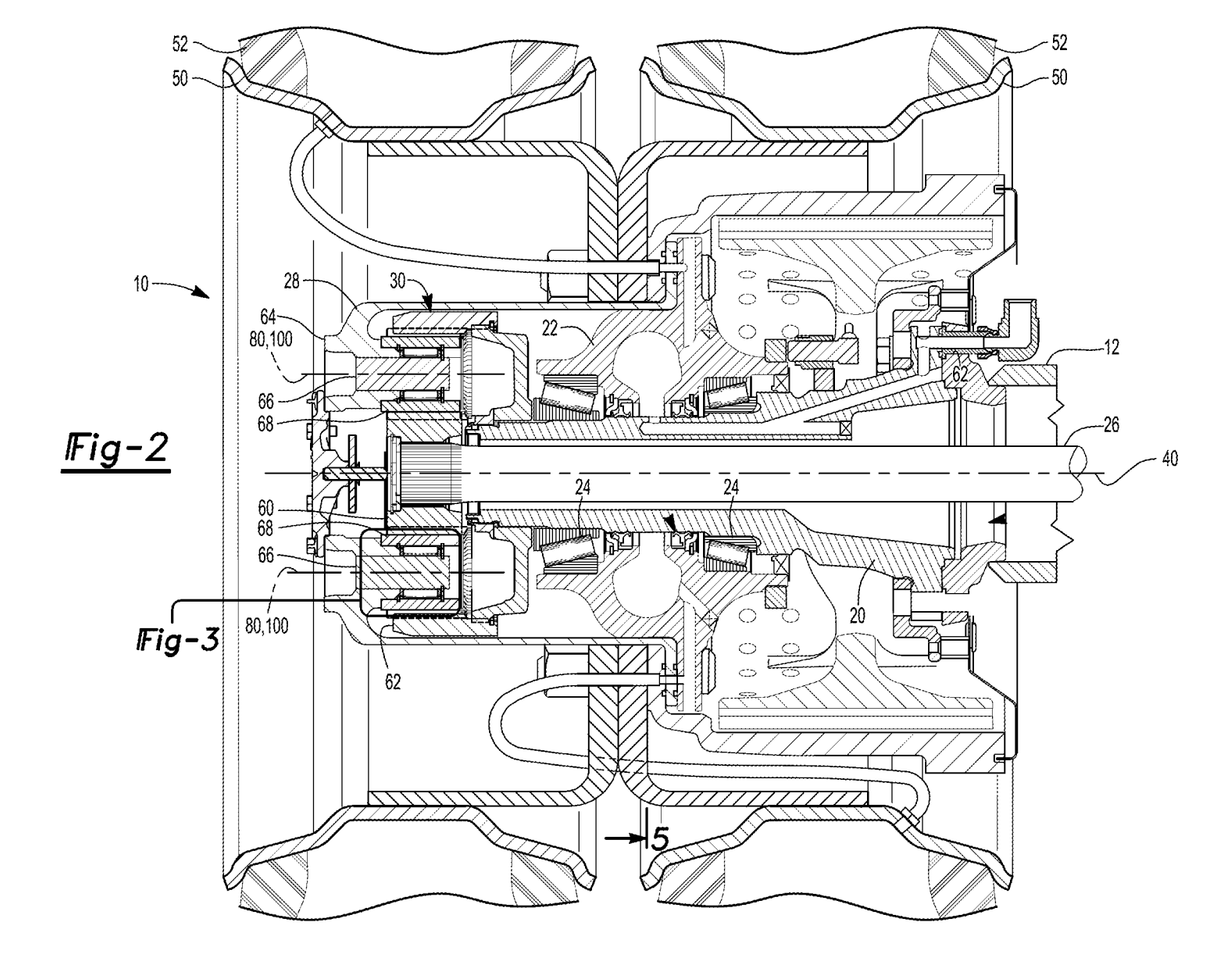
FIG. 2 is a section view along section line 2-2 showing a planetary gear set and with the addition of a wheel assembly mounted to the wheel end assembly.

The spindle 20 may extend along or around an axis 40 and may be configured to support components of the wheel end assembly 10. The spindle 20 may be fixedly mounted to or fixedly positioned with respect to the structural component 12. It is contemplated that the spindle 20 may be integrally formed with the structural component 12 rather than being a separate part from the structural component 12.

The hub 22, which may also be called a wheel hub, may be rotatable about the axis 40 with respect to the spindle 20. In addition, the hub 22 may be configured to facilitate mounting of at least one wheel 50 that may support a tire 52. The hub 22 may be operatively connected to the axle shaft 26 via the planetary gear set 30. A portion of a brake assembly such as a brake drum or a brake rotor may be fixedly mounted to the hub 22.

At least one wheel bearing 24 may be disposed on the spindle 20 and may rotatably support the hub 22. In the configuration shown, two wheel bearings 24 are illustrated. A wheel bearing 24 may have any suitable configuration. For instance, the wheel bearing 24 may include a plurality of rolling elements, such as balls or rollers, that may be disposed between an inner race and an outer race. The inner race may extend around and may be disposed on a surface of the spindle 20. The outer race may engage the hub 22 and may extend around the inner race.

The axle shaft 26 may provide torque to the wheel end assembly 10. For instance, the axle shaft 26 may be operatively connected at a first end to a vehicle drivetrain component, such as a differential or vehicle power source, and may be coupled to or operatively connected to the planetary gear set 30 at a second end. In at least one embodiment, the axle shaft 26 or a portion thereof may extend along the axis 40. For example, the axle shaft 26 or a portion thereof may extend through a hole in the spindle 20 and may be operatively connected to the planetary gear set 30. It is also contemplated that the axle shaft 26 may be configured for use with an independent suspension system and may have multiple shaft segments and/or joints that may facilitate relative movement between the first end and the wheel end assembly 10.

The hub housing 28 may be fixedly mounted to the hub 22. As such, the hub housing 28 and the hub 22 may be rotatable together about the axis 40 with respect to the spindle 20. The hub housing 28 may extend around and may at least partially receive the spindle 20, the hub 22, a wheel bearing 24, the planetary gear set 30, or combinations thereof.

The planetary gear set 30 may transmit torque between the axle shaft 26 and the hub 22. The planetary gear set 30 may have any suitable configuration. For instance, the planetary gear set 30 may include a sun gear 60, a planetary ring gear 62, a planet gear carrier 64, at least one planet shaft 66, and at least one planet gear 68.

The sun gear 60 may be disposed proximate the center of the planetary gear set 30. For instance, the sun gear 60 may extend along or around the axis 40. In at least one configuration, the sun gear 60 may have a sun gear hole, a sun gear spline, and a gear portion.

The sun gear hole may extend along and may be centered about the axis 40.

The sun gear spline may facilitate coupling of the sun gear 60 to another component, such as the axle shaft 26. For instance, the sun gear spline may have a set of spline teeth that may mate or mesh with spline teeth on the axle shaft 26 to inhibit rotation of the sun gear 60 with respect to the axle shaft 26. It is also contemplated that the sun gear hole, the sun gear spline, or both may be omitted and the sun gear 60 may be integrally formed with a shaft or may be coupled to a shaft in another manner, such as with a weld, fasteners, an interference fit, or the like.

The gear portion may include a set of teeth that may face away from the axis 40. The set of teeth may be arranged around the axis 40 and may be configured to mate or mesh with corresponding teeth of a planet gear 68.

The planetary ring gear 62 may be configured as a ring that may extend around the axis 40. The planetary ring gear 62 may receive and may encircle the planet gears 68. The planetary ring gear 62 may include a set of planetary ring gear teeth that may extend toward the axis 40 and may mate or mesh with teeth of the planet gears 68. In the configuration shown, the planetary ring gear 62 is fixedly positioned with respect to the spindle 20 and does not rotate about the axis 40; however, it is contemplated that the planetary ring gear 62 may be rotatable in other configurations or applications. For instance, the planetary gear set 30 may be configured such that the sun gear 60 or the planet gear carrier 64 is grounded rather than the planetary ring gear 62. It is also contemplated that the sun gear 60, the planetary ring gear 62, or the planet gear carrier 64 may be an input or an output of the planetary gear set 30.

The planet gear carrier 64, which may also be referred to as a planet carrier, may help support the planet gears 68. In at least one configuration, the planet gear carrier 64 may be rotatable about the axis 40. In the configuration shown, the planet gear carrier 64 may be part of the hub housing 28 or may be fixedly positioned with respect to the hub housing 28.

Figure 3:
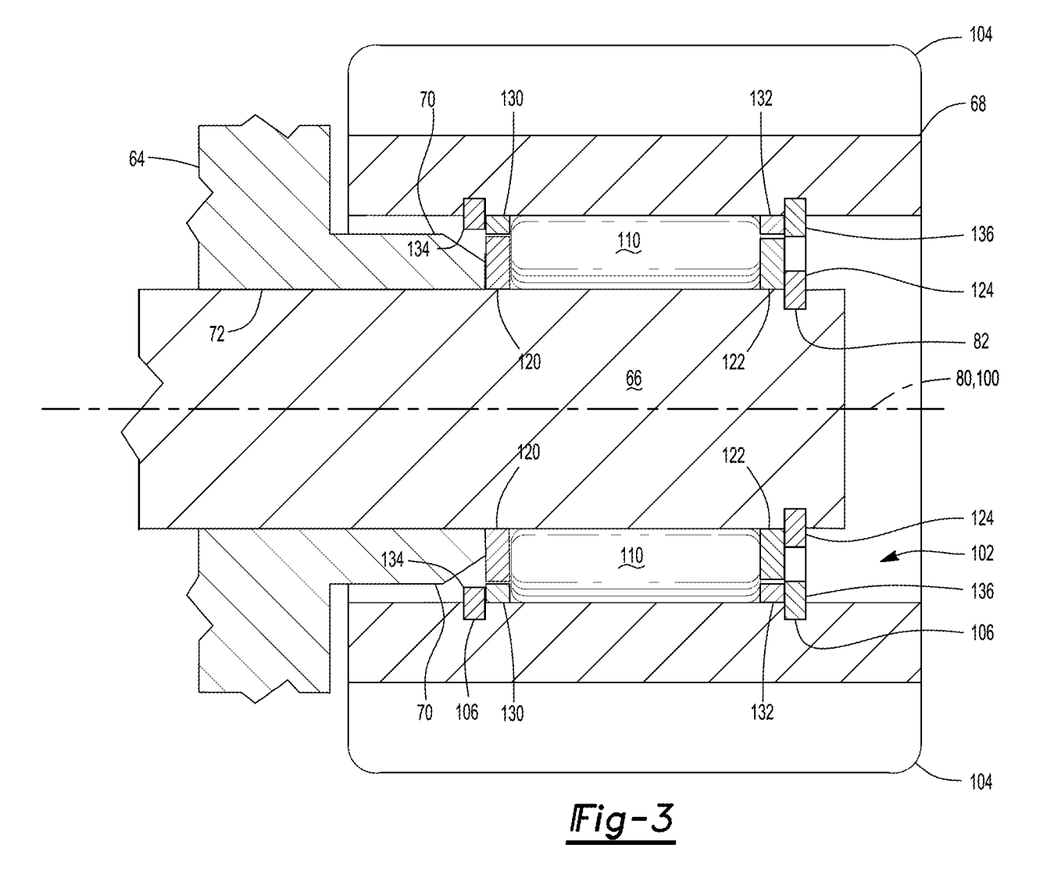
FIGS. 3 and 4 are magnified section views that illustrate arrangements for supporting a planet gear of the planetary gear set.
Figure 4:
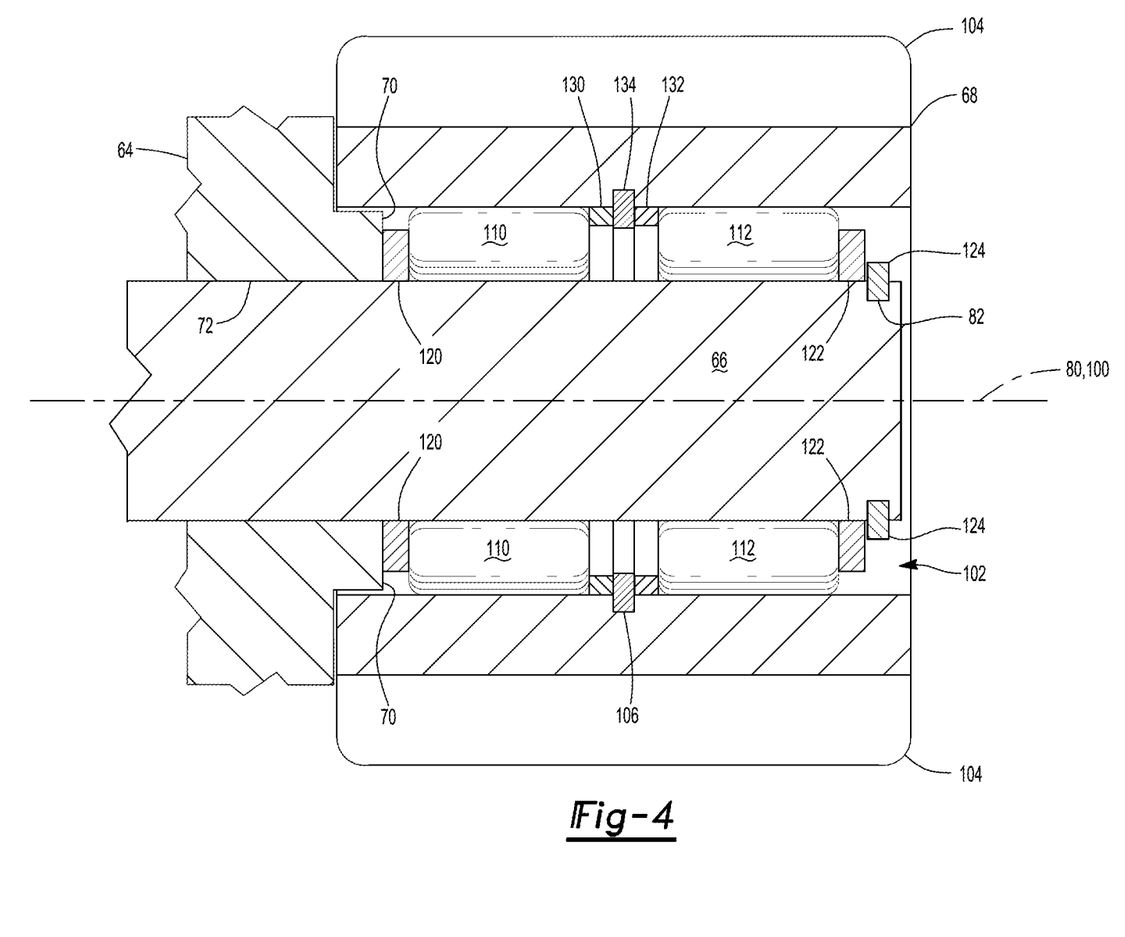

Referring to FIGS. 3 and 4, a portion of the planet gear carrier 64 may be disposed inside a hole of a planet gear 68. For instance as is shown in FIGS. 3 and 4, the planet gear carrier 64 may define a protrusion 70 that may extend inside the hole of a planet gear 68. The protrusion 70 may extend partially or continuously around a planet carrier hole 72 that may be provided with the planet gear carrier 64. The planet carrier hole 72 may receive the planet shaft 66.

The planet shaft 66, which may also be referred to as a planetary pinion shaft, may extend from the planet gear carrier 64 into the hole of the planet gear 68. The planet shaft 66 may be cantilevered from the planet gear carrier 64 or supported at one end by the planet gear carrier 64. Such a configuration may simplify the geometry of the planet gear carrier 64 increase the power density of the planet gear carrier 64. The planet shaft 66 may not protrude out of the open end of the hole in a planet gear 68, which may help reduce the axial length of the planetary gear set 30.

The planet shaft 66 may have any suitable configuration. For instance, the planet shaft 66 may have a cylindrical configuration and may extend along a planet shaft axis 80. The planet shaft 66 may be fixedly positioned with respect to the planet gear carrier 64. For instance, the planet shaft 66 may be integrally formed with the planet gear carrier 64, in which case the planet carrier hole 72 may be omitted, or the planet shaft 66 may be provided as a separate component from the planet gear carrier 64. If the planet shaft 66 is provided as a separate component, then the planet shaft 66 may be coupled to the planet gear carrier 64 in any suitable manner, such as with an interference fit, mating threads, fastener, adhesive, weld, or the like.

In at least one configuration, a planet shaft groove 82 may be provided with the planet shaft 66. The planet shaft groove 82 may extend from an outer circumferential surface of the planet shaft 66 toward the planet shaft axis 80 and may encircle or partially encircle the planet shaft axis 80. The planet shaft groove 82 may receive a shaft retainer as will be discussed in more detail below.

Referring to FIGS. 2-4, at least one planet gear 68 may be rotatably disposed between the sun gear 60 and the planetary ring gear 62. In FIG. 2, two planet gears 68 are visible but it is contemplated that a greater or lesser number of planet gears 68 may be provided. Each planet gear 68, which may also be referred to as a planetary pinion or a planet pinion, may be rotatable about a different planet gear axis 100. The planet gear axes 100, which may also be referred to as planet pinion axes, may extend substantially parallel to the axis 40 and may be coaxially disposed with the planet shaft axis 80. Each planet gear 68 may define a hole 102 and may have a set of teeth 104. In addition, a planet gear 68 may define one or more planet grooves 106.

The hole 102 may be a through hole that may extend through planet gear 68. The hole 102 may encircle and may be spaced apart from the planet shaft 66 and the planet shaft axis 80. In addition, the hole 102 may encircle and may be spaced apart from a protrusion 70 that extends from the planet gear carrier 64.

The set of teeth 104 may be disposed opposite the hole 102. The set of teeth 104 may mesh with teeth of the gear portion of the sun gear 60 and the planetary ring gear teeth of the planetary ring gear 62. These teeth are omitted for clarity for FIGS. 3 and 4.

One or more planet grooves 106 may be provided with a planet gear 68. In the configuration shown in FIG. 3, two planet grooves 106 are provided that are spaced apart from each other. In FIG. 4, a single planet groove 106 is provided. The planet groove 106 may extend from an inner circumferential surface of the planet gear 68 that may define the hole 102 in a direction that may extend away from the planet shaft axis 80 and toward the set of teeth 104. The planet groove 106 may encircle or partially encircle the planet shaft axis 80. The planet groove 106 may receive a planet retainer as will be discussed in more detail below.

Referring to FIGS. 3 and 4, two configurations for rotatably supporting a planet gear 68 on a planet shaft 66 are shown. As an overview, each configuration may include at least one set of bearing rollers that may rotatably support a planet gear 68 upon a corresponding planet shaft 66. In addition, a combination of thrust washers and retainers may be provided. A thrust washer that is disposed adjacent to a planet shaft 66 may be referred to as a shaft thrust washer. Similarly, a retainer that is disposed adjacent to a planet shaft 66 may be referred to as a shaft retainer. A thrust washer that is disposed adjacent to a planet gear 68 may be referred to as a planet thrust washer. Similarly, a retainer that is disposed adjacent to a planet gear 68 may be referred to as a planet retainer.

Referring to FIG. 3, a first configuration for rotatably supporting a planet gear 68 is shown. This configuration includes one set of bearing rollers which may be referred to as a first set of bearing rollers 110. A first shaft thrust washer 120, a second shaft thrust washer 122, and a shaft retainer 124 may be associated with the planet shaft 66. A first planet thrust washer 130, a second planet thrust washer 132, a first planet retainer 134, and a second planet retainer 136 may be associated with the planet gear 68.

The first set of bearing rollers 110 may rotatably support the planet gear 68 on the planet shaft 66. The first set of bearing rollers 110 may be received inside the hole 102 of the planet gear 68 and may be arranged around the planet shaft 66. For instance, the bearing rollers 110 may extend from the outside circumference of the planet shaft 66 to the inner circumferential surface of the planet gear 68. In addition, the bearing rollers 110 may be axially positioned between the first shaft thrust washer 120 and the second shaft thrust washer 122, and between the first planet thrust washer 130 and the second planet thrust washer 132. The bearing rollers 110 may have any suitable configuration. In the configuration shown, each bearing roller 110 has a cylindrical configuration that has a diameter that is less than its length. Each bearing roller 110 may have a first end and a second end. The first end may face toward the planet gear carrier 64. The second end may be disposed opposite the first end and may face away from the planet gear carrier 64.

The first shaft thrust washer 120 may be received inside the hole 102 in the planet gear 68. The first shaft thrust washer 120 may extend between the planet gear carrier 64 and the first set of bearing rollers 110. For example, the first shaft thrust washer 120 may be axially positioned between the protrusion 70 of the planet gear carrier 64 and the first end of the bearing rollers 110. In addition, the first shaft thrust washer 120 may contact the protrusion 70 and the first end of the bearing rollers 110. The first shaft thrust washer 120 may encircle and may engage the planet shaft 66. It is contemplated that multiple first shaft thrust washers 120 may be provided. For instance, two or more adjacent first shaft thrust washers 120 may be provided instead of a single first shaft thrust washer 120. Other thrust washers may also be provided in single or multiple arrangements.

The second shaft thrust washer 122 may be received inside the hole 102 in the planet gear 68. The second shaft thrust washer 122 may extend between the first set of bearing rollers 110 and the shaft retainer 124. For example, the second shaft thrust washer 122 may be axially positioned between the bearing rollers 110 and the shaft retainer 124 and may contact the second end of the bearing rollers 110 and the shaft retainer 124. The second shaft thrust washer 122 may encircle and may engage the planet shaft 66.

The shaft retainer 124 may be received inside the hole 102 in the planet gear 68. The shaft retainer 124 may engage the second shaft thrust washer 122 and the planet shaft 66 to limit axial movement of the second shaft thrust washer 122 and the first set of bearing rollers 110 with respect to the planet shaft 66. The shaft retainer 124 may protrude from the planet shaft 66 in a direction that extends away from the planet shaft axis 80 and may have any suitable configuration. For instance, the shaft retainer 124 may be configured as a clip or a snap ring that may be partially received in the planet shaft groove 82 of the planet shaft 66 and that may protrude from the outside circumferential surface of the planet shaft 66 to engage the second shaft thrust washer 122.

The first planet thrust washer 130 may be received inside the hole 102 in the planet gear 68. As such, the first planet thrust washer 130 may encircle the planet shaft 66. The first planet thrust washer 130 may extend between the first planet retainer 134 and the first set of bearing rollers 110. For example, the first planet thrust washer 130 may be axially positioned between and may contact the first planet retainer 134 and the first end of the bearing rollers 110. The first planet thrust washer 130 may engage the inside circumferential surface of the planet gear 68. The first planet thrust washer 130 may encircle but may be spaced apart from the first shaft thrust washer 120.

The second planet thrust washer 132 may be received inside the hole 102 in the planet gear 68. As such, the second planet thrust washer 132 may encircle the planet shaft 66. The second planet thrust washer 132 may extend between the second planet retainer 136 and the bearing rollers 110. For example, the second planet thrust washer 132 may be axially positioned between and may contact the second planet retainer 136 and the second end of the bearing rollers 110. Accordingly, the first set of bearing rollers 110 may be axially positioned between the first planet thrust washer 130 and the second planet thrust washer 132. The second planet thrust washer 132 may engage the inside circumferential surface of the planet gear 68. The second planet thrust washer 132 may encircle but may be spaced apart from the second shaft thrust washer 122.

The first planet retainer 134 may be received inside the hole 102 in the planet gear 68. The first planet retainer 134 may engage the first planet thrust washer 130 and the planet gear 68 to limit axial movement of the first set of bearing rollers 110 and the first planet thrust washer 130 with respect to the planet gear 68. The first planet retainer 134 may protrude from the planet gear 68 in a direction that extends toward the planet shaft axis 80 and may have any suitable configuration. For instance, the first planet retainer 134 may be configured as a clip or a snap ring that may be partially received in the first planet groove 106 of the planet gear 68 and that may protrude from the inside circumferential surface of the planet gear 68 to engage the first planet thrust washer 130. In at least one configuration, the first planet retainer 134 may encircle but may be spaced apart from the protrusion 70 of the planet gear carrier 64.

The second planet retainer 136 may be received inside the hole 102 in the planet gear 68. The second planet retainer 136 may engage the second planet thrust washer 132 and the planet gear 68 to limit axial movement of the second planet thrust washer 132 and the first set of bearing rollers 110 with respect to the planet gear 68. The second planet retainer 136 may protrude from the planet gear 68 in a direction that extends toward the planet shaft axis 80 and may have any suitable configuration. For instance, the second planet retainer 136 may be configured as a clip or a snap ring that may be partially received in the second planet groove 106 of the planet gear 68 and that may protrude from the inside circumferential surface of the planet gear 68 to engage the second planet thrust washer 132. In at least one configuration, the second planet retainer 136 may encircle but may be spaced apart from the shaft retainer 124.

Referring to FIG. 4, a second configuration for rotatably supporting a planet gear 68 is shown. This configuration includes two sets of bearing rollers which may be referred to as a first set of bearing rollers 110 and a second set of bearing rollers 112. A first shaft thrust washer 120, a second shaft thrust washer 122, and a shaft retainer 124 may be associated with the planet shaft 66. A first planet thrust washer 130, a second planet thrust washer 132, and a first planet retainer 134, may be associated with the planet gear 68.

The first set of bearing rollers 110 may rotatably support the planet gear 68 on the planet shaft 66. The first set of bearing rollers 110 may be received inside the hole 102 of the planet gear 68 and may be arranged around the planet shaft 66. For instance, the bearing rollers 110 may extend from the outside circumference of the planet shaft 66 to the inner circumferential surface of the planet gear 68. In addition, the bearing rollers 110 may be axially positioned between the first shaft thrust washer 120 and the first planet thrust washer 130. The bearing rollers 110 may have any suitable configuration. In the configuration shown, each bearing roller 110 has a cylindrical configuration that has a diameter that is less than its length. Each bearing roller 110 may have a first end and a second end. The first end may face toward the planet gear carrier 64. The second end may be disposed opposite the first end and may face away from the planet gear carrier 64.

The second set of bearing rollers 112 may also rotatably support the planet gear 68 on the planet shaft 66. The second set of bearing rollers 112 may be spaced apart from the first set of bearing rollers 110. The second set of bearing rollers 112 may be received inside the hole 102 of the planet gear 68 and may be arranged around the planet shaft 66. For instance, the bearing rollers 112 12 may extend from the outside circumference of the planet shaft 66 to the inner circumferential surface of the planet gear 68. In addition, the bearing rollers 112 may be axially positioned between the second shaft thrust washer 122 and the second planet thrust washer 132. The bearing rollers 112 may have any suitable configuration. For instance, the first set of bearing rollers 110 and the second set of bearing rollers 112 may have the same configurations. Each bearing roller 112 may have a first end and a second end. The first end may face toward the planet gear carrier 64. The second end may be disposed opposite the first end and may face away from the planet gear carrier 64.

The first shaft thrust washer 120 may have the same configuration as previously described.

The second shaft thrust washer 122 may have the same configuration as previously described except that the second shaft thrust washer 122 may engage the second set of bearing rollers 112. The second shaft thrust washer 122 may extend between the second set of bearing rollers 112 and the shaft retainer 124. For example, the second shaft thrust washer 122 may be axially positioned between and may contact the second end of the bearing rollers 112 and the shaft retainer 124.

The shaft retainer 124 may have the same configuration as previously described. However, the shaft retainer 124 may engage the second shaft thrust washer 122 and the planet shaft 66 to limit axial movement of the second shaft thrust washer 122 and the second set of bearing rollers 112 with respect to the planet shaft 66.

The first planet thrust washer 130 may be received inside the hole 102 in the planet gear 68 and may encircle the planet shaft 66 as previously described. The first planet thrust washer 130 may extend between the first planet retainer 134 and the first set of bearing rollers 110. For example, the first planet thrust washer 130 may be axially positioned between and may contact the first planet retainer 134 and the second end of the bearing rollers 110. As a result, the first set of bearing rollers 110 may be axially positioned between the first shaft thrust washer 120 and the first planet thrust washer 130. The first planet thrust washer 130 may engage the inside circumferential surface of the planet gear 68. The first planet thrust washer 130 may encircle the planet shaft 66 but may not encircle the first shaft thrust washer 120.

The second planet thrust washer 132 may be received inside the hole 102 and may encircle the planet shaft 66 as previously described. The second planet thrust washer 132 may extend between the first planet retainer 134 and the second set of bearing rollers 112. For example, the second planet thrust washer 132 may be axially positioned between and may contact the first planet retainer 134 and the first end of the second set of bearing rollers 112. Accordingly, the second set of bearing rollers 112 may be axially positioned between the second planet thrust washer 132 and the second shaft thrust washer 122. The second planet thrust washer 132 may engage the inside circumferential surface of the planet gear 68. The second planet thrust washer 132 may encircle the planet shaft 66 but may not encircle the second shaft thrust washer 122.

The first planet retainer 134 may be received inside the hole 102 in the planet gear 68 as previously described. The first planet retainer 134 may engage the first planet thrust washer 130, the second planet thrust washer 132, and the planet gear 68 to limit axial movement of the first planet thrust washer 130, the second planet thrust washer 132, the first set of bearing rollers 110, and the second set of bearing rollers 112 with respect to the planet gear 68. For instance, the first planet retainer 134 may extend axially from the first planet thrust washer 130 to the second planet thrust washer 132. The first planet retainer 134 may protrude from the planet gear 68 in a direction that extends toward the planet shaft axis 80 and may have any suitable configuration as previously described.

The present invention may allow planet gears to be rotatably supported on a cantilevered planet pin without customized or special order roller bearing assemblies, which reduces manufacturing costs. In addition, the planet gear carrier may help establish or control the axial positioning of one or more sets of bearing rollers, which may help eliminate the need for additional snap rings or other components. The present invention may also help provide a planetary gear set which is more axially compact, which may reduce package space, weight, and associated costs.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A planetary gear set comprising:
   a planet gear carrier;
   a planet gear that defines a hole and that is rotatable about a planet gear axis;
   a planet shaft that extends from the planet gear carrier into the hole;
   a first set of bearing rollers that is received inside the hole and that rotatably supports the planet gear on the planet shaft; and
   a first shaft thrust washer that extends between the planet gear carrier and the first set of bearing rollers, wherein the planet gear carrier is partially disposed inside the hole in the planet gear.

2. The planetary gear set of claim 1 wherein the first shaft thrust washer contacts the planet gear carrier and the first set of bearing rollers.

3. The planetary gear set of claim 1 wherein the first shaft thrust washer encircles the planet shaft.

4. The planetary gear set of claim 1 further comprising a second shaft thrust washer that encircles the planet shaft and engages the first set of bearing rollers, wherein the first set of bearing rollers is axially positioned between the first shaft thrust washer and the second shaft thrust washer.

5. The planetary gear set of claim 1 further comprising a first planet thrust washer that is disposed in the hole and that engages the planet gear and the first set of bearing rollers.

6. The planetary gear set of claim 5 wherein the first planet thrust washer encircles the first shaft thrust washer.

7. The planetary gear set of claim 1 further comprising a second set of bearing rollers that is received inside the hole and that rotatably supports the planet gear on the planet shaft, wherein the second set of bearing rollers is spaced apart from the first set of bearing rollers.

8. The planetary gear set of claim 1 further comprising a sun gear that is rotatable about an axis with an axle shaft and a planetary ring gear that is coupled to the planet gear carrier that is rotatable with a hub, wherein the set of planet gears mesh with the sun gear and the planetary ring gear.

9. A planetary gear set comprising:
    a planet gear carrier;
    a planet gear that defines a hole and that is rotatable about a planet gear axis;
    a planet shaft that extends from the planet gear carrier into the hole;
    a first set of bearing rollers that is received inside the hole and that rotatably supports the planet gear on the planet shaft; and
    a first shaft thrust washer that extends between the planet gear carrier and the first set of bearing rollers; and
    a second shaft thrust washer that encircles the planet shaft and engages the first set of bearing rollers, wherein the first set of bearing rollers is axially positioned between the first shaft thrust washer and the second shaft thrust washer, and a shaft retainer engages the second shaft thrust washer and the planet shaft to limit axial movement of the second shaft thrust washer and the first set of bearing rollers with respect to the planet shaft.

10. A planetary gear set comprising:
    a planet gear carrier;
    a planet gear that defines a hole and that is rotatable about a planet gear axis;
    a planet shaft that extends from the planet gear carrier into the hole;
    a first set of bearing rollers that is received inside the hole and that rotatably supports the planet gear on the planet shaft;
    a first shaft thrust washer that extends between the planet gear carrier and the first set of bearing rollers;
    a first planet thrust washer that is disposed in the hole and that engages the planet gear and the first set of bearing rollers; and
    a first planet retainer that is disposed in the hole and engages the first planet thrust washer and the planet gear to limit axial movement of the first set of bearing rollers and the first planet thrust washer with respect to the planet gear.

11. The planetary gear set of claim 10 wherein the planet gear carrier is partially disposed inside the hole in the planet gear.

12. The planetary gear set of claim 10 further comprising a second planet thrust washer that is disposed in the hole, encircles the planet shaft, and engages the first set of bearing rollers, wherein the first set of bearing rollers is axially positioned between the first planet thrust washer and the second planet thrust washer.

13. A planetary gear set comprising:
    a planet gear carrier;
    a planet gear that defines a hole and that is rotatable about a planet gear axis;
    a planet shaft that extends from the planet gear carrier into the hole;
    a first set of bearing rollers that is received inside the hole and that rotatably supports the planet gear on the planet shaft;
    a first shaft thrust washer that extends between the planet gear carrier and the first set of bearing rollers;
    a first planet thrust washer that is disposed in the hole and that engages the planet gear and the first set of bearing rollers; and
    a second planet thrust washer that is disposed in the hole, encircles the planet shaft, and engages the first set of bearing rollers, wherein the first set of bearing rollers is axially positioned between the first planet thrust washer and the second planet thrust washer, the second planet thrust washer encircles a second shaft thrust washer that encircles the planet shaft and engages the first set of bearing rollers, and the first set of bearing rollers is axially positioned between the first shaft thrust washer and the second shaft thrust washer.

14. The planetary gear set of claim 13 wherein a second planet retainer is disposed in the hole and engages the second planet thrust washer and the planet gear to limit axial movement of the first set of bearing rollers and the second planet thrust washer with respect to the planet gear.

15. The planetary gear set of claim 14 wherein the second planet retainer encircles a shaft retainer that engages the second shaft thrust washer and the planet shaft to limit axial movement of the second shaft thrust washer and the first set of bearing rollers with respect to the planet shaft.

16. A planetary gear set comprising:
    a planet gear carrier;
    a planet gear that defines a hole and that is rotatable about a planet gear axis;
    a planet shaft that extends from the planet gear carrier into the hole;
    a first set of bearing rollers that is received inside the hole and that rotatably supports the planet gear on the planet shaft;
    a first shaft thrust washer that extends between the planet gear carrier and the first set of bearing rollers;
    a second set of bearing rollers that is received inside the hole and that rotatably supports the planet gear on the planet shaft, wherein the second set of bearing rollers is spaced apart from the first set of bearing rollers; and
    a second shaft thrust washer that encircles the planet shaft and engages the second set of bearing rollers, wherein the second set of bearing rollers is axially positioned between the first set of bearing rollers and the second shaft thrust washer.

17. The planetary gear set of claim 16 wherein a shaft retainer engages the second shaft thrust washer and the planet shaft to limit axial movement of the second shaft thrust washer and the second set of bearing rollers with respect to the planet shaft.

18. The planetary gear set of claim 16 further comprising a first planet thrust washer that is disposed in the hole and that engages the planet gear and the first set of bearing rollers, wherein the first set of bearing rollers is axially positioned between the first shaft thrust washer and the first planet thrust washer.

19. The planetary gear set of claim 18 further comprising a second planet thrust washer that is disposed in the hole and that engages the planet gear and the second set of bearing rollers, wherein the second set of bearing rollers is axially positioned between the second shaft thrust washer and the second planet thrust washer.

20. The planetary gear set of claim 19 further comprising a first planet retainer that is disposed in the hole and engages the first planet thrust washer, the second planet thrust washer, and the planet gear to limit axial movement of the first planet thrust washer and the second planet thrust washer with respect to the planet gear.

* * * * *